Jan. 26, 1971 M. MARTIN 3,558,754
PROCESS OF MANUFACTURING HOSE PIPES
Filed Feb. 27, 1968

INVENTOR
Michel Martin
BY Watson, Cole, Grindle + Watson
ATTORNEYS

# United States Patent Office

3,558,754
Patented Jan. 26, 1971

3,558,754
PROCESS OF MANUFACTURING HOSE PIPES
Michel Martin, Reims, France, assignor to Eau et Feu Societe Anonyme, Reims, France
Filed Feb. 27, 1968, Ser. No. 708,554
Int. Cl. B29h 7/14
U.S. Cl. 264—94
5 Claims

ABSTRACT OF THE DISCLOSURE

A method of hose manufacture which consists in introducing into a textile jacket an impermeable lining tube having a composite flowable surface layer, and then subjecting the assembly to internal pressure and to heat followed by external pressure to cause the outer part of the surface layer to form flexible sheets around the yarns of the jacket and the inner part of the surface layer thereafter to exude through the outer part to form an abrasion-resistant cover on the hose.

---

Figure 1:
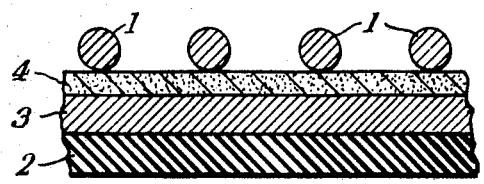

It has been proposed in United States patent application No. 307,276 to manufacture hose, and in particular fire hose, by introducing into a textile jacket a lining tube of rubber or other expandable plastic material having a surface layer which has the capacity of flowing more readily when subjected to heat and pressure than the body of the tube and subjecting the hose, after introduction of the lining tube, to internal pressure and heat to cause the surface layer of the lining tube to exude through the interstices of the jacket to the exterior of the jacket. The body of the lining tube then remains within the jacket to form a thin impermeable lining while the spikes of the exuded surface material are afterwards smoothed down to form an external cover on the jacket.

It is often desired that the hose should have an abrasion resistant cover and if, with this aim in view, a lining tube with a surface layer having a high resistance to abrasion is utilized in the above-described method the resulting hose is sometimes unduly stiff, particularly at low temperatures. This is because the surface layer forms a sheath round the yarns of the jacket in addition to exuding through the jacket to form the spikes which are subsequently smoothed down to form the abrasion resistant cover.

With a view to avoiding this disadvantage the invention provides a method of manufacturing a hose constituted by a textile jacket having a thin impermeable lining and an external cover, which comprises introducing into the jacket a lining tube of rubber or expandable plastic material having a composite surface layer of which the inner portion is abrasion resistant and the outer portion is flexible, subjecting the assembly to external pressure and also to heat to cause the outer portion of the composite surface layer of the lining tube to exude outwardly, applying pressure to the exuded material of the outer portion of the surface layer to form sheaths around the yarns of the jacket, continuing application of internal pressure and heat to cause the inner portion of the surface layer to exude through the outer portion and the jacket to form projecting spikes leaving the body of the lining tube within the jacket, and applying pressure to the spikes to form them into an abrasion resisting cover on the jacket.

The body of the lining tube may be of rubber or of plastics material, for example nylon. The portions of the composite surface layer may be of the same polymer differently formulated or of different polymers. They may be of different thickness and preferably the ratio of the thickness of the inner abrasion resistant portion to the thickness of the outer flexible portion is in the range of 0.5–2.0.

Preferably the two portions of the composite surface layer consist of suitably compounded polymer blends of nitrile rubber and polyvinyl chloride. Other examples of suitable material for the abrasion resistant portion are thermoplastic polyurethane, and a blend of thermoplastic polyurethane and polyvinyl chloride and these may be used in association with a flexible portion of plasticized polyvinyl chloride, the body of the lining tube being a polymer blend of nitrile rubber and polyvinyl chloride. As a further alternative the abrasion resistant portion may be a polychloroprene compound containing carbon black as a filler and the flexible portion a polychloroprene compound which is flexible at low temperatures. In this case the body of the lining tube may also be of polychloroprene.

The textile jacket is preferably woven, but it may if desired be knitted or braided.

The following is an example of the manufacture of a fire hose having a water-impermeable lining and an abrasion resistant cover by the method according to the invention.

An inner lining tube was made by extrusion from the following compound:

| | Parts by weight |
|---|---|
| Butakon AC 5502 | 100 |
| Sulphur | 0.5 |
| Zinc oxide | 5 |
| Antioxidant | 2 |
| Stearic acid | 1 |
| Carbon black | 30 |
| DIOS | 15 |
| PPA | 15 |
| TMT accelerator | 3 |

This inner tube was 0.030 inch thick and had a flat width of 1.9 inches.

This tube when then heated in a steam autoclave for 9 minutes at 40 p.s.i. steam pressure to vulcanise it.

This inner tube weighed 0.058 lbs./ft.

Around this inner lining tube was extruded a tubular layer, of thickness 0.8 mm., of the following material which has good resistance to abrasion and weather:

| | Parts by weight |
|---|---|
| Krynac 850, a polymer blend of 50% nitrile rubber and 50% polyvinyl chloride | 100 |
| Stearic acid | 1 |
| Sulphur | 1 |
| Antioxidant | 2 |
| Antiozonant | 2 |
| Zinc oxide | 5 |
| Carbon black | 50 |
| Dioctyl sebacate | 15 |
| Dinonyl phthalate | 15 |
| Robac ZMD accelerator | 0.7 |
| Vulcafor MBTS | 1 |

A further tubular layer, of thickness 0.5 mm., was extruded around the assembly of the following material:

| | Parts by weight |
|---|---|
| Polymer blend of 70% nitrile rubber and 30% polyvinyl chloride | 100 |
| Calcium stearate | 1 |
| Stearic acid | 1 |
| Zinc oxide | 3 |
| Antioxidant | 1 |
| Colour | 1 |
| Dioctyl sebacate | 5 |
| Dinonyl phthalate | 5 |
| Vulcafor HBS | 2 |
| Vulcafor TMT | 1 |
| Sulphur | 0.5 |

The resulting tube was then drawn into a woven textile jacket of the following construction:

Warp: 76 ends of 10 ply 250 denier "Terylene" (registered trademark) (0.0165 lb. per foot).
Weft: 10 picks per inch of 5 ply 840 denier nylon (0.0157 lb. per foot)
Total weight per foot:
0.0322 lb. unsized
0.035 lb. sized The jacket had an internal diameter of 1½" after sizing. It was sized with a p.v.c./nitrile latex to prevent movement of the yarns during handling.

An internal air pressure of 50 p.s.i. was then applied to the lining tube so that the surface layer tube was tightly squeezed between the lining tube and the jacket.

Two travelling hot air ovens, each 3 ft. long, were then arranged to travel along the hose, each oven carrying at its trailing end three pairs of rollers, at 60° to each other.

These ovens were arranged to travel at 0.5 ft. per minute with an air temperature of 160° C. The air velocity in the ovens was approximately 2000 ft./minute, and at this speed exudation of the surface layer occurred satisfactorily. On completion the finished fire hose had an external diameter of 1.65 inches, and an internal diameter of 1.5 inches.

The apparatus for inflating the hose and the ovens were of the construction described and illustrated in United States patent application No. 307,276, apart from the fact that, as mentioned above, two travelling ovens were used.

The flow of the composite surface layer of the lining tube under the actoin of internal air pressure and external heat is illustrated in the accompanying diagrammatic drawings in which FIGS. 1–7 illustrate successive stages in the operation.

The figures are sectional views showing the jacket and the lining tube, the weft yarns 1 only of the jacket being shown. The inner body of the lining tube is shown at 2, the superposed layer of material having resistance to abrasion and weather is shown at 3 and the superposed layer of material having the properties of impregnating and adhering to the jacket and conferring flxeibility on the hose is shown at 4.

The velocity of layers 3 is higher than that of layer 4 due to the inclusion in layer 3 of a substantial proportion of carbon black. This higher viscosity enables layer 3 to flow through layer 4 as described below, while the lower viscosity of layer 4 causes that layer to flow outwardly first, as also described below.

Figure 2:
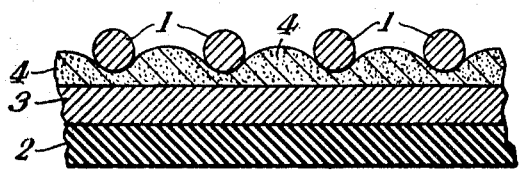
Figure 3:
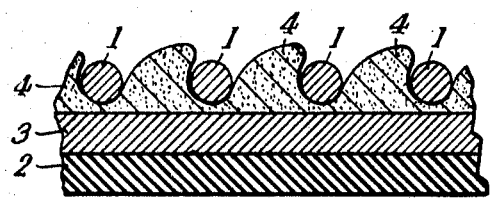
Figure 4:
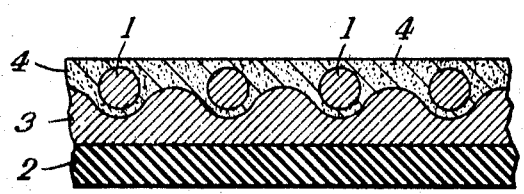
Figure 5:
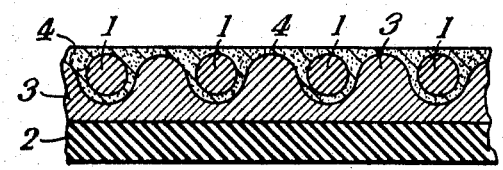
Figure 6:
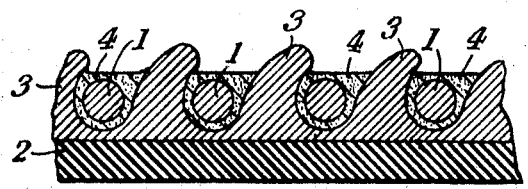
Figure 7:
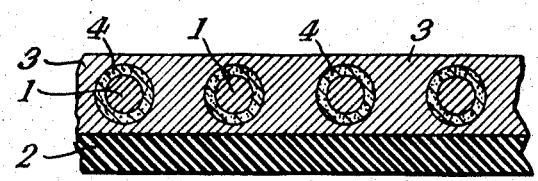

FIG. 1 shows the lining tube as initially introduced into the jacket. As shown in FIG. 2, upon application of internal air pressure and external heat by the first oven the layer 4 begins to flow outwardly through the jacket, gradually exuding further as shown in FIG. 3. The action of the rollers following the first oven is to wrap the layer around the yarns of the jacket as shown in FIG. 4. As shown in FIG. 5, in the second oven the layer 3 begins to penetrate the layer 4 and finally exudes through the layer 4 and the jacket, as shown in FIG. 6, to form spikes which are smoothed down by the rollers following the second oven as shown in FIG. 7 to form the abrasion resisting cover of the hose.

If so desired, the layer 4 can itself be composite and include an outer portion which wraps around the yarns of the jacket to provide waterproofing and an inner portion which flows outwardly to bond together the yarns of the jacket. As before the layer 3 will exude through the composite outer layer as pillars which are afterwards rolled down to provide the protective abrasion resistant cover. In this case three travelling ovens, each followed by rollers, will be required. The outer portion of the layer 4 will on passage through the first oven and the following rollers be wrapped around the yarns to form inner sheaths on them. Following this the inner portion of the layer 4 will on passage through the second oven and the following rollers be wrapped around the yarns to form outer sheaths on them. Finally, the layer 3 will exude on passage through the third oven and be rolled down by the following rollers to form the outer cover.

An appropraite material for the outer waterproofing portion, which can be used on a lining tube of the construction described in the foregoing example, is:

| | Parts by weight |
|---|---|
| Polymer blend of 70% nitrile rubber and 30% p.v.c. | 100 |
| Polybutadiene | 20 |
| Calcium stearate | 1 |
| Stearic acid | 1 |
| Zinc oxide | 3 |
| Antioxidant | 1 |
| Diethylene glycol | 1 |
| Silicia filler | 15 |
| Dioctyl phthalate | 7.5 |
| Dioctyl sebacate | 7.5 |
| Vulcafor HBS | 2 |
| Vulcafor TMT | 1 |
| Sulphur | 0.5 |

What I claim as my invention and desire to secure by Letters Patent is:

1. A method of manufacturing a hose constituted by a textile jacket having a thin impermeable lining and an external cover, which comprises introducing into the jacket a lining tube of a material selected from the group consisting of rubber and expandable plastic material having a composite surface layer of which the inner portion is relatively viscous and abrasion resistant and the outer portion is relatively fluid and flexible, subjecting the assembly to internal pressure and also to heat to cause the outer portion of the composite surface layer of the lining tube to exude outwardly, applying pressure to the exuded material of the outer portion of the surface layer to form sheaths around the yarns of the jacket, continuing application of internal pressure and heat to cause the inner portion of the surface layer to exude through the outer portion and the jacket to form projecting spikes, leaving the body of the lining tube within the jacket, and applying pressure to the spikes to form them into an abrasion resisting cover on the jacket.

2. A method as claimed in claim 1, in which both portions of the composite surface layer are made of a polymer blend of nitrile rubber and polyvinyl chloride.

3. A method as claimed in claim 1, wherein the ratio of the thickness of the abrasion resistant portion to the thickness of the flexible outer portion is in the range of 0.5–2.0.

4. A method as claimed in claim 1, in which the heat to which the assembly is subjected is external heat and pressure is applied to the exuded material by two sets of rollers which act in succession on the assembly.

5. A method as claimed in claim 1, in which the outer portion of the composite surface layer of the lining tube is itself composite and consists of an outer portion, having waterproofing characters, which exudes first and is caused by application of pressure to form inner sheaths on the yarns and an inner flexible portion which exudes next and is caused by application of pressure to form outer sheaths on the yarns prior to exudation of the inner portion of the composite surface layer.

References Cited
UNITED STATES PATENTS 3,370,115  2/1968  Wood _____ 264—94

ROBERT F. WHITE, Primary Examiner

T. J. CARVIS, Assistant Examiner

U.S. Cl. X.R.

264—173, 255, 257, 273